(12) United States Patent
Retersdorf

(10) Patent No.: US 11,492,127 B2
(45) Date of Patent: Nov. 8, 2022

(54) AIR CYCLE MACHINES, AIR CYCLE MACHINE SYSTEMS, AND METHODS OF CONTROLLING AIR FLOW IN AIR CYCLE MACHINES

(71) Applicant: Hamilton Sundstrand Corporation, Charlotte, NC (US)

(72) Inventor: Alan Retersdorf, Avon, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 391 days.

(21) Appl. No.: 16/720,850

(22) Filed: Dec. 19, 2019

(65) Prior Publication Data

US 2021/0188448 A1 Jun. 24, 2021

(51) Int. Cl.
| | | |
|---|---|---|
| *B64D 13/08* | (2006.01) | |
| *F25B 9/00* | (2006.01) | |
| *B64D 13/06* | (2006.01) | |
| *F02C 9/18* | (2006.01) | |
| *F24F 5/00* | (2006.01) | |

(52) U.S. Cl.
CPC .............. *B64D 13/08* (2013.01); *F25B 9/004* (2013.01); *B64D 2013/064* (2013.01); *B64D 2013/0618* (2013.01); *B64D 2013/0648* (2013.01); *B64D 2013/0688* (2013.01); *F02C 9/18* (2013.01); *F24F 5/0085* (2013.01)

(58) Field of Classification Search
CPC ............ B64D 13/08; B64D 2013/0618; B64D 2013/064; B64D 2013/0648; B64D 2013/0688; F25B 9/004; F02C 9/18; F24F 5/0085
USPC ......................................................... 62/402
See application file for complete search history.

(56) References Cited

U.S. PATENT DOCUMENTS

| | | | |
|---|---|---|---|
| 6,070,418 A | 6/2000 | Crabtree et al. | |
| 7,334,423 B2 | 2/2008 | Bruno et al. | |
| 9,656,755 B2 | 5/2017 | Durbin et al. | |
| 10,408,501 B2 | 9/2019 | Elsherbini et al. | |
| 2004/0195447 A1 | 10/2004 | Claeys | |
| 2006/0059942 A1 | 3/2006 | McAuliffe et al. | |
| 2015/0166187 A1* | 6/2015 | Durbin ................... | B64D 13/08 62/402 |

FOREIGN PATENT DOCUMENTS

| | | | |
|---|---|---|---|
| EP | 1220777 B1 * | 7/2003 | ............. B64D 13/06 |
| EP | 1220777 B1 | 7/2003 | |
| GB | 795110 A | 5/1958 | |
| WO | 2011123703 A1 | 10/2011 | |

OTHER PUBLICATIONS

European Search Report for Application No. 20215806.9, dated May 7, 2021, 7 pages.

* cited by examiner

*Primary Examiner* — Steve S Tanenbaum
(74) *Attorney, Agent, or Firm* — Cantor Colburn LLP

(57) ABSTRACT

An air cycle machine includes a compressor in fluid communication with a load cooling heat exchanger, a first valve and a first turbine connecting the compressor to the load cooling heat exchanger, and a second valve and a second turbine. The second valve and the second turbine connect the compressor to the load cooling heat exchanger and connected in parallel with the first valve and the first turbine between the compressor and the load cooling heat exchanger. Air cycle machine systems and methods of controlling air flow through air cycle machines are also described.

16 Claims, 5 Drawing Sheets

AIR CYCLE MACHINES, AIR CYCLE MACHINE SYSTEMS, AND METHODS OF CONTROLLING AIR FLOW IN AIR CYCLE MACHINES

BACKGROUND

The present disclosure relates generally to air cycle machines, and more particularly to controlling air flow through air cycle machines with dual parallel turbines.

Air cycle machines, such as air conditioning packs carried by aircraft, are commonly employed to provide conditioned air to environmentally controlled spaces (e.g., an aircraft cabin or cockpit). Such air cycle machines generally employ a centrifugal compressor, two air-to-air heat exchangers and an expansion turbine. Compressed air is communicated to the compressor, further compressed, cooled and thereafter expanded in the expansion turbine. As the air traverses the expansion turbine the air cools to a temperature suitable for mixing with ambient air for introduction into the environmentally controlled spaces. The power for such air cycle machines is generally provided by the differential between pressure of the compressed air provided to the compressor and that output pressure of the air cycle machines.

In some air cycle machines performance of the air cycle machine can be influenced by change in the air cycle machine operating conditions. For example, decrease in pressure of the air input to the compressor can reduce the size of the cooling load that the air cycle machine is capable to carry. And while air cycle machines for a given application are generally selected to operate with acceptable performance at a particular design and/or sizing within a relatively large envelope, performance can drop off as conditions approach the extremes of the operating conditions envelope.

Such systems and methods have generally been acceptable for their intended purpose. However, there remains a need in the art for improved air cycle machines, air cycle machine systems, and methods of controlling flow through air cycle machines.

BRIEF DESCRIPTION

An air cycle machine is provided. The air cycle machine includes a compressor in fluid communication with a load cooling heat exchanger, a first valve and a first turbine connecting the compressor to the load cooling heat exchanger, and a second valve and a second turbine. The second valve and the second turbine connect the compressor to the load cooling heat exchanger and connected in parallel with the first valve and the first turbine between the compressor and the load cooling heat exchanger.

In addition to one or more of the features described above, or as an alternative, further examples of the air cycle machine may include a compressor in fluid communication with a load cooling heat exchanger; a first valve and a first turbine connecting the compressor to the load cooling heat exchanger; and a second valve and a second turbine connecting the compressor to the load cooling heat exchanger, wherein the second valve and the second turbine are connected in parallel with the first valve and the first turbine between the compressor and the load cooling heat exchanger.

In addition to one or more of the features described above, or as an alternative, further examples of the air cycle machine may include a primary heat exchanger connected to the compressor, the compressor connecting the primary heat exchanger to the first valve and the second valve.

In addition to one or more of the features described above, or as an alternative, further examples of the air cycle machine may include a secondary heat exchanger connected to the compressor, the secondary heat exchanger connecting the compressor to the first valve and the second valve.

In addition to one or more of the features described above, or as an alternative, further examples of the air cycle machine may include a union connecting the first turbine to the second turbine and therethrough to the load cooling heat exchanger.

In addition to one or more of the features described above, or as an alternative, further examples of the air cycle machine may include that the first valve has a closed position, the first valve fluidly coupling the compressor to the first turbine in the closed position to cool the first turbine.

In addition to one or more of the features described above, or as an alternative, further examples of the air cycle machine may include that the second valve has a closed position, the second valve fluidly coupling the compressor to the second turbine in the closed position to cool the second turbine.

In addition to one or more of the features described above, or as an alternative, further examples of the air cycle machine may include a common shaft operably connecting the first turbine and the second turbine to the compressor.

In addition to one or more of the features described above, or as an alternative, further examples of the air cycle machine may include a compressed air source connected to the air cycle machine without an intervening flow control valve.

In addition to one or more of the features described above, or as an alternative, further examples of the air cycle machine may include that the first turbine is a first fixed turbine, wherein the second turbine is a second fixed turbine.

In addition to one or more of the features described above, or as an alternative, further examples of the air cycle machine may include that the second turbine is symmetrical with the first turbine.

In addition to one or more of the features described above, or as an alternative, further examples of the air cycle machine may include that the second turbine is asymmetrical with the first turbine.

In addition to one or more of the features described above, or as an alternative, further examples of the air cycle machine may include a controller operatively connected to the first valve and the second valve; and a memory in communication with the controller and having a plurality of program modules recorded thereon with instructions that cause the controller to throttle open at least one of the first valve and the second valve; and throttle closed at least one of the first valve and the second valve.

In addition to one or more of the features described above, or as an alternative, further examples of the air cycle machine may include that throttling open the at least one of the first valve and the second valve includes reducing hydraulic resistance of the air cycle machine, wherein throttling closed at least one of the first valve and the second valve includes increasing hydraulic resistance of the air cycle machine.

In addition to one or more of the features described above, or as an alternative, further examples of the air cycle machine may include throttling open the at least one of the first valve and the second valve is in response to decrease in pressure of compressed air received at the compressor.

In addition to one or more of the features described above, or as an alternative, further examples of the air cycle machine may include that throttling open at least one of the first valve and the second valve is in response to increase in pressure of compressed air received at the compressor.

In addition to one or more of the features described above, or as an alternative, further examples of the air cycle machine may include that the instructions recorded on the memory cause the controller to receive a flow characteristic of a compressed air flow provided to the air cycle machine; and select one of the first valve and the second valve for throttling according to the received flow characteristic and a difference between efficiency of the first turbine and the second turbine associated with the received flow characteristic.

An air cycle machine system is also provided. The air cycle machine includes an air cycle machine as described by above. The first turbine and the second turbine are asymmetrical relative to one another, a controller is operatively connected to the first valve and the second valve, and a memory disposed in communication with the controller. The memory has instructions recorded thereon that cause the controller to receive a signal indicative of a flow characteristic of a compressed air flow received at the air cycle machine, select at least one of the first valve and the second valve for throttling according to the received flow characteristic and a difference between efficiency of the first turbine and the second turbine associated with the received flow characteristic, and throttle open or throttle closed the selected at least one of the first valve and the second valve.

A method of controlling flow through an air cycle machine is additionally provided. The method includes at an air cycle machine as described above, throttling open at least one of the first valve and the second valve and throttling closed at least one of the first valve and the second valve.

In addition to one or more of the features described above, or as an alternative, further examples of the method includes selecting at least one of the first valve and the second valve according to pressure of the compressed air flow received at the air cycle machine, or selecting at least one of the first valve and the second valve according to asymmetry between the first turbine and the second turbine of the air cycle machine.

In addition to one or more of the features described above, or as an alternative, further examples of the method may include cooling the first turbine or the second turbine connected to the closed at least one of the first valve and the second valve with a portion of the compressed air flow traversing the closed at least one of the first valve and the second valve.

Technical effects of the present disclosure include air cycle machines having the capability to throttle air flow through two expansion turbines connected in parallel between the air cycle machine compressor and the load cooling heat exchanger of the air cycle machine. Technical effects of the present disclosure also include the capability to adjust the hydraulic resistance presented by the air cycle machine to the compressed air source providing compressed air to the air cycle machine, reducing (or eliminating entirely) the need to provide an external flow control valve, e.g., a bleed valve, to the air cycle machine. In certain examples the dual parallel turbines are symmetric to one another, e.g., have substantially identical flow characteristics. In accordance with certain examples the dual parallel turbines are asymmetric with one another, e.g., have different flow characteristics. It is contemplated that one or the other of the dual parallel turbines can be selected and throttled open and/or be throttled closed according to pressure of the compressed air flow provided to the air cycle machine. It is also contemplated that, when either valve is closed, a nominal (e.g., small) amount of compressed air continue to flow through the turbine downstream of the valve for cooling the turbine.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
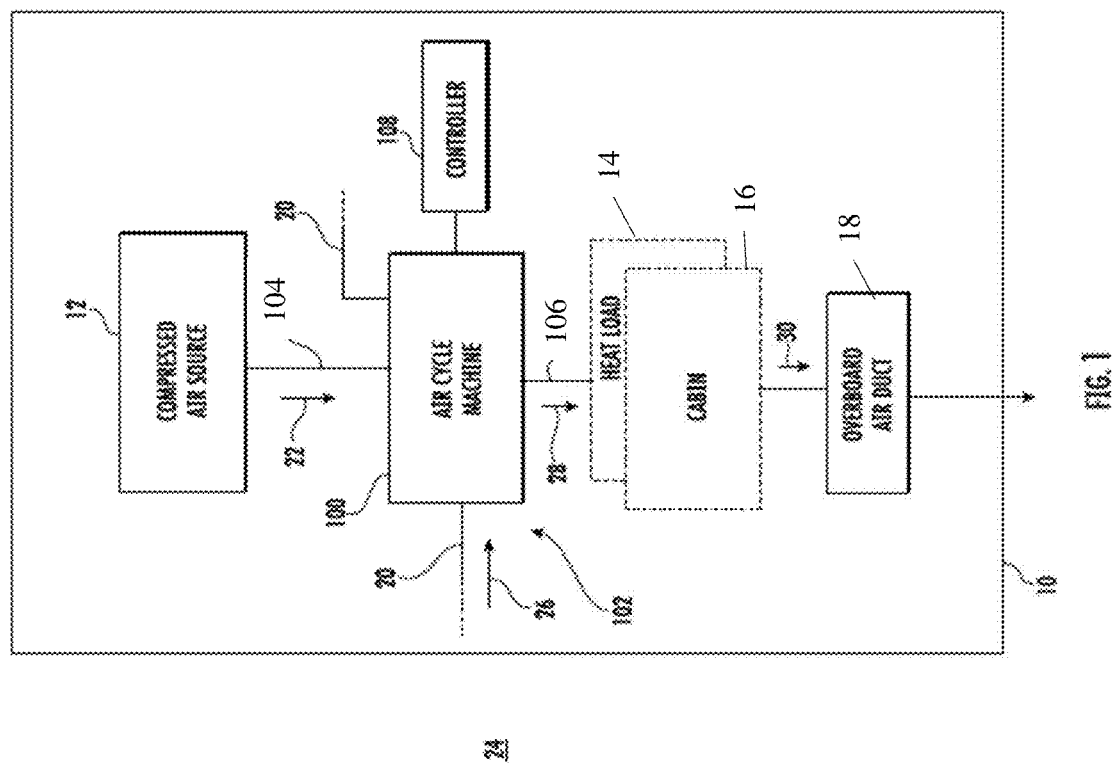
FIG. 1 is a schematic view of an air cycle machine constructed in accordance with the present disclosure, showing the air cycle machine connected to a compressed air source for removing heat from a heat load.

Reference will now be made to the drawings wherein like reference numerals identify similar structural features or aspects of the subject disclosure. For purposes of explanation and illustration, and not limitation, a partial view of an example of an air cycle machine constructed in accordance with the disclosure is shown in FIG. 1 and is designated generally by reference character 100. Other embodiments of air cycle machines, air cycle machine systems, and methods of controlling flow through air cycle machines, are provided in FIGS. 2-5, as will be described. The systems and methods described herein can be used remove heat from heat loads and/or to provide conditioned air to environmentally controlled spaces on vehicles, such as aircraft, through the present disclosure is not limited to aircraft or to any particular type of heat load and/or particular type of environmentally controlled space in general.

Referring to FIG. 1, a vehicle 10, e.g., an aircraft, is shown. The vehicle 10 carries an air cycle machine system 102 including the air cycle machine 100, a compressed air source 12, and a heat load 14. The illustrated vehicle 10 also includes a cabin 16, an overboard air duct 18, and a fan or ram air duct 20.

The air cycle machine system 102 includes an input conduit 104, an output conduit 106, and a controller 108. The input conduit 104 connects the compressed air source 12 to the air cycle machine 100 to provide a compressed air flow 22 to the air cycle machine 100. The fan or ram air duct 20 connects the environment external to the vehicle, e.g., the external environment 24, to the air cycle machine 100 to provide an ambient air flow 26 to the air cycle machine 100. The air cycle machine 100 is arranged to condition the compressed air flow 22 to generate a conditioned air flow 28, which the air cycle machine employs to remove heat 30 from the heat load 14 and/or to provide the conditioned air flow 28 to the cabin 16. The controller 108 is operably connected to the air cycle machine 100 for controlling flow through the air cycle machine 100, as will be described. The output conduit 106 connects the air cycle machine 100 to the overboard air duct 18, and therethrough to the external environment 24, to issue the conditioned air flow 28 thereto. In certain examples the cabin 16 is fluidly connected in series between the air cycle machine 100 and the overboard air duct 18.

As will be appreciated by those of skill in the art in view of the present disclosure, flow control valves are commonly employed to provide control over inlet pressure of air provided to air cycle machines, e.g., pressure of the compressed air flow 12. Such control valves generally enable turndown of the air cycle machine when desired, typically by throttling away pressure from upstream (and external to) the air cycle machine. While generally acceptable for its intended purpose, throttling away pressure can waste the pressure of compressed air provided to the air cycle machine, reducing efficiency of the air cycle machine. To limit (or eliminate entirely) the efficiency losses posed such flow control valves the air cycle machine 100 is provided.

Figure 2:
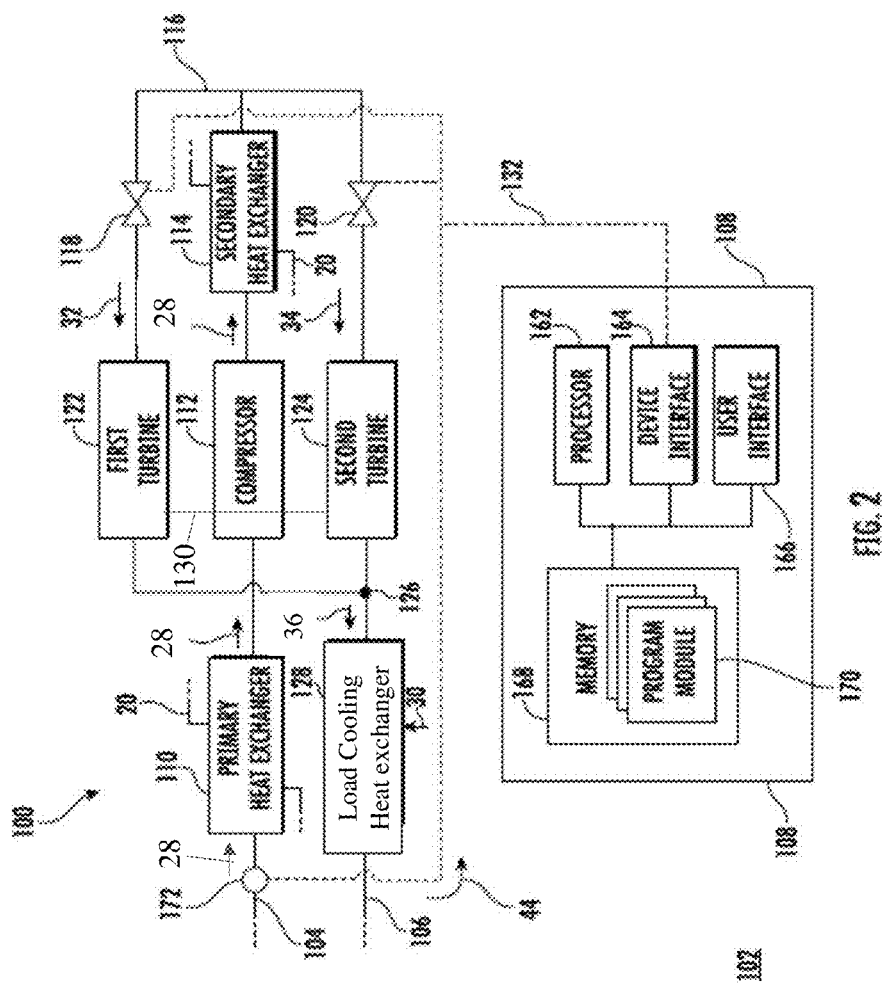
FIG. 2 is a schematic view of the air cycle machine of FIG. 1, showing a compressor connected to a load cooling heat exchanger by dual parallel turbines and throttle valves.

With reference to FIG. 2, the air cycle machine 100 is shown. The air cycle machine 100 includes a primary heat exchanger 110, a compressor 112, and a secondary heat exchanger 114. The air cycle machine 100 also includes a manifold 116, a first valve 118, and a second valve 120. The air cycle machine 100 additionally includes a first turbine 122, a second turbine 124, a union 126 and a load cooling heat exchanger 128.

The input conduit 104 is connected to the compressed air source 12 to provide the compressed air flow 28 to the primary heat exchanger 110. The primary heat exchanger 110 is connected to the input conduit to receive therefrom the compressed air flow 28 and is also connected to the fan or ram air duct 20. The fan or ram air duct 20 provides the ambient air flow 26 to the primary heat exchanger 110 to transfer heat from the compressed air flow 28 to the ambient air flow 26. Once cooled, the primary heat exchanger communicates the compressed air flow 28 to the compressor 112. In certain examples a flow sensor 172 is in communication with the input conduit 104 to provide a signal 44 to the controller 108 indicative of a flow characteristic of the compressed air flow 22, e.g., pressure.

The compressor 112 is connected to the primary heat exchanger 110 to receive therefrom the compressed air flow 28 and further compresses the compressed air flow 28. Further compression of the compressed air flow 28 is accomplished using mechanical rotation provided by the first turbine 122 and/or the second turbine 124. In the illustrated example the first turbine 122 and the second turbine 124 are both connected to the compressor 112 by a singular shaft 130, the singular shaft 130 operably associating both the first turbine 122 and the second turbine 124 with the compressor 112. Once further compressed the compressor 112 provides the compressed air flow 28 to the secondary heat exchanger 114.

The secondary heat exchanger 114 is connected to the compressor 112 to receive therefrom the compressed air flow 28 and is also connected to the fan or ram air duct 20. The fan or ram air duct 20 provides the ambient air flow 26 to the secondary heat exchanger 114 to transfer additional heat from the compressed air flow 28 to the ambient air flow 26 traversing the fan or ram air duct 20. Once further cooled the secondary heat exchanger 114 communicates the compressed air flow 28 to the manifold 116.

The manifold 116 is connected to the compressor 112 and fluidly couples the compressor to both the first valve 118 and the second valve 120. More specifically, the manifold 116 divides the compressed air flow 28 into a first compressed air flow portion 32 and a second air flow portion 34 according hydraulic resistance presented to the compressed air flow 28 by the first valve 118 and the second valve 120, respectively. The first compressed air flow portion 32 is communicated to the first valve 118 and the second compressed air flow portion 34 is communicated to the second valve 120.

The first valve 118 is connected to the manifold 116, fluidly couples the compressor 112 to the load cooling heat exchanger 128 in parallel with the second valve 120 and the second turbine 124 and receives the first compressed air flow portion 32 from the manifold 116. It is contemplated that the first valve 118 be a throttle valve arranged for throttling flow therethrough, hydraulic resistance through the first valve 118 varying according to throttling of the first valve 118. Throttling of the first valve 118 is accomplished by the controller 108, which is operably connected to the first valve 118 through the link 132. In certain examples the first valve 118 is a continuous flow valve, fluid continuing to flow through the first valve 118 when throttled to a fully closed position to cool the first turbine 122. In this respect the first valve 118 can include a stop, e.g., a stop 134 (shown in FIG. 3), or define therethrough an orifice, e.g., an orifice 136 (shown in FIG. 4), to flow the first compressed air flow portion 32 therethrough at a nominal flow rate for cooling the first turbine 122 irrespective to throttling of the first valve 118.

The first turbine 122 is connected to the first valve 118, fluidly couples the first valve 118 to the union 126 and is connected in parallel with the second valve 120 and the second turbine 124 between the compressor 112 and the load cooling heat exchanger 128. The first turbine 122 is configured to expand and extract work from fluid traversing the first turbine 122. In this respect the first turbine 122 receives the first compressed air flow portion 32 from the first valve 118, expands the first compressed air flow portion 32, and extracts work from the first compressed air flow portion 32. The extracted work is communicated to the compressor 112 through the singular shaft 130, e.g., a common shaft, and the expanded first compressed air flow portion 32 communicated to the union 126. It is contemplated that the first compressed air flow portion 32 cool during expansion as the first compressed air flow portion 32 traverses the first turbine 122.

The second valve 120 is connected to the manifold 116, fluidly couples the compressor 112 to the load cooling heat exchanger 128 in parallel with the first valve 118 and the first turbine 122 and receives the second compressed air flow portion 34 from the manifold 116. It is contemplated that the second valve 120 be a throttle valve arranged for throttling flow therethrough, hydraulic resistance through the second valve 120 varying according to throttling of the second valve 120. Throttling of the second valve 120 is accomplished by the controller 108, which is operably connected to the second valve 120 through the link 132. In certain examples the second valve 120 is a continuous flow valve, fluid continuing to flow through the second valve 120 when throttled to a fully closed position to cool the second turbine 124. In this respect the second valve 120 can include a stop, e.g., the stop 134 (shown in FIG. 3), or define therethrough an orifice, e.g., the orifice 136 (shown in FIG. 4), to flow the second compressed air flow portion 34 therethrough at a nominal flow rate for cooling the second turbine 124 irrespective to throttling of the second valve 120.

The second turbine 124 is connected to the second valve 120 and fluidly couples the second valve 120 to the union 126. The second turbine 124 is also connected in parallel with the first valve 118 and the first turbine 122 between the compressor 112 and the load cooling heat exchanger 128 and is configured to expand and extract work from fluid traversing the first turbine 122. In this respect the second turbine 124 receives the second compressed air flow portion 34 from the second valve 120, expands the second compressed air flow portion 34, and extracts work from the second compressed air flow portion 34 as the second compressed air flow portion 34 traverse the second turbine 124. The extracted work is communicated to the compressor 112 through the singular shaft 130 and the expanded second compressed air flow portion 34 communicated to the union 126. It is contemplated that the second compressed air flow portion 34 cool during expansion as the second compressed air flow portion 34 traverses the first turbine 122.

In certain examples the second turbine 124 can be symmetrical to the first turbine 122, e.g., have performance characteristics that are substantially identical to those of the first turbine 122. In accordance with certain examples the second turbine 124 can be asymmetrical to the first turbine 122, e.g., have performance characteristics that are different than those of the first turbine 122. Asymmetry can expand the operating range of the air cycle machine 100, allowing the hydraulic resistance of the air cycle machine to be selected to correspond to the first turbine 122 or the second turbine 124 by throttling down (e.g., throttling closed) one of the first valve 118 and the second valve 120 more aggressively than the other of the first valve 118 and the second valve 120. It is also contemplated that at least one (or both) the first turbine 122 and the second turbine 124 can be fixed turbine, e.g., have one position nozzles, providing less leakage and/or angle of incidence losses (and therefore relatively high efficiency) in comparison to turbines having more than one nozzle position.

The union 126 is connected to both the first turbine 122 and the second turbine 124 and receives therefrom the first compressed air flow portion 32 and the second air flow portion 34. At the union 126 the first compressed air flow portion 32 intermixes with the second air flow portion 34 and is communicated to the load cooling heat exchanger 128 as the conditioned air flow 36.

The load cooling heat exchanger 128 is connected to the union 126 and fluidly couples the union 126 to the output conduit 106. In certain examples the load cooling heat exchanger 128 is in thermal communication with the heat load 14 (shown in FIG. 1) to remove the heat 30 from the heat load 14. In accordance with certain examples the load cooling heat exchanger 128 is arranged to heat the conditioned air flow 36 (shown in FIG. 1) prior to communication to the cabin 16 (shown in FIG. 1). The output conduit 106 in turn connects the overboard air duct 18 to communicate the conditioned air flow 36 to the external environment 24.

Figure 3:
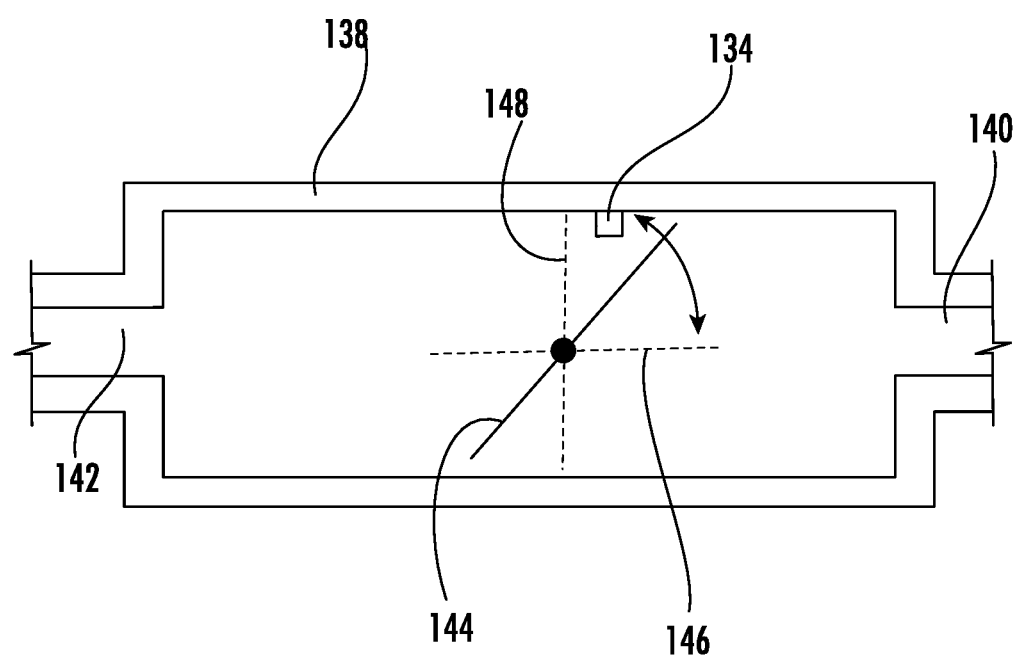
FIG. 3 is schematic diagram of a portion of the air cycle machine of FIG. 1 according to an example, showing a throttle valve with valve position stop for cooling the turbine connected to the valve.

With reference to FIG. 3, the first valve 118 is shown according to an example. As shown in FIG. 3, the first valve 118 includes stop 134, a valve body 138 with an inlet port 140 and an outlet port 142, and a valve member 144. The inlet port 140 connects the first valve 118 to the manifold 116 (shown in FIG. 2), the outlet port 142 connects the valve body 138 to the first turbine 122 (shown in FIG. 2), and the valve body 138 fluidly couples the inlet port 140 to the outlet port 142. The valve member 144 is supported within the valve body 138 and has an open position 146, wherein hydraulic resistance of the first valve 118 presented to the fluid at the inlet port 140 is relatively low (e.g., hydraulic resistance is minimized), and a closed position 148, wherein hydraulic resistance presented to fluid flow at the inlet port 140 is relatively high (e.g., hydraulic resistance is maximized).

In the illustrated example the stop 134 is arranged for movement between the open position 146 and the closed position 148 to limit hydraulic resistance of the first valve 118. Arrangement of the stop 134 between the open position 146 and the closed position 148 causes compressed fluid present at the inlet port 104 to flow at a nominal mass flow rate through the valve body 138 from the inlet port 140 when the valve member 144 abuts the stop 134, the compressed fluid flowing through the outlet port 142 to cool the first turbine 122. It is contemplated that the controller 108 (shown in FIG. 1) be operably connected to the first valve 118 to throttle the valve member 114 between the open position 146 and the stop 134, e.g., by fixing position of the valve member therebetween to select the hydraulic resistance presented to fluid at the inlet port 140 of the valve body 138. In certain examples the second valve 120 is similar to the first valve 118, is also operably associated with the controller 108, and additionally fluidly couples the manifold 116 to the second turbine 124 to provide cooling to the second turbine 124 when throttled such that the valve member therein abuts the stop supported within the valve body.

Figure 4:
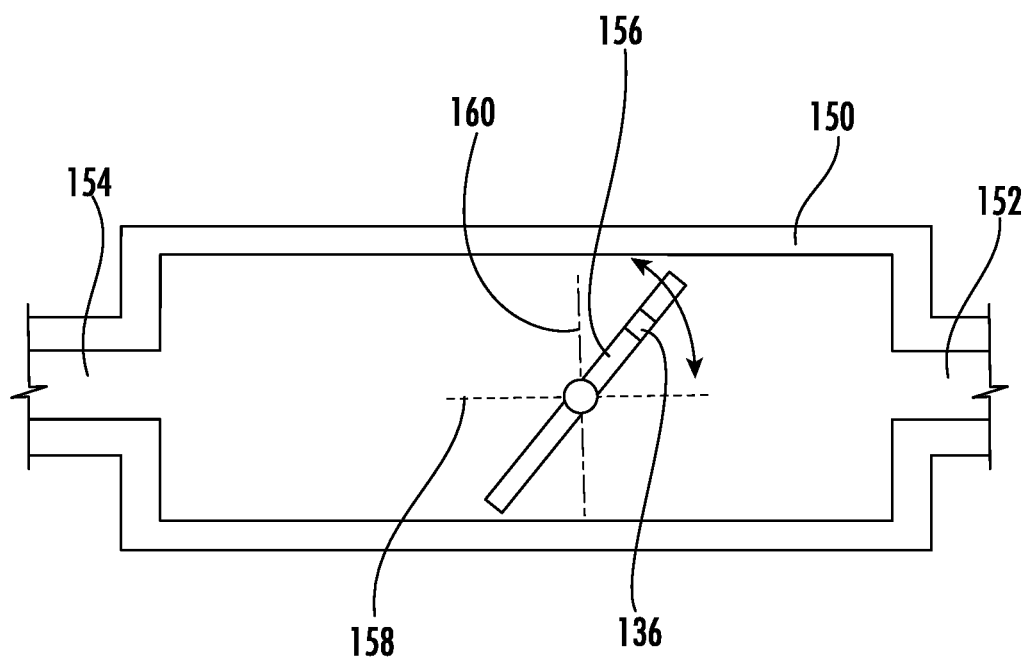
FIG. 4 is a schematic diagram of a portion of the air cycle machine of FIG. 1 according to another example, showing a bypass orifice for cooling the turbine connected to the valve.

With reference to FIG. 4, the first valve 118 is shown according to another example. As shown in FIG. 4, the first valve 118 includes a valve body 150 with an inlet port 152 and an outlet port 154, and a valve member 156 defining therethrough the orifice 136. The inlet port 152 connects the first valve 118 to the manifold 116 (shown in FIG. 2), the outlet port 154 connects the valve body 150 to the first turbine 122 (shown in FIG. 2), and the valve body 150 fluidly couples the inlet port 152 to the outlet port 154. The valve member 156 is supported within the valve body 150 and has an open position 158, wherein hydraulic resistance of the first valve 118 presented to the fluid at the inlet port 152 is relatively low (e.g., hydraulic resistance minimized), and a closed position 160, wherein hydraulic resistance presented to fluid flow at the inlet port 152 is relatively high (e.g., hydraulic resistance is maximized).

In the illustrated example the valve member 156 is arranged for movement between the open position 158 and the closed position 160. The orifice 136 defined through the valve member 156 is arranged to limit hydraulic resistance presented by the first valve 118 to the fluid at the inlet port 152 when the valve member 156 is in the closed position 160. Specifically, when the valve member 156 is in the closed position the orifice 136 fluidly couples the inlet port 152 with the outlet port 154, compressed fluid thereby traversing the first valve 118 when closed at a nominal mass flow rate through the valve body 150, the compressed fluid flowing through the outlet port 154 to provide cooling to the first turbine 122. It is contemplated that the controller 108 (shown in FIG. 1) be operably connected to the first valve 118 to throttle the valve member 156 between the open position 158 and the closed position 160, e.g., by fixing position of the valve member therebetween to select the hydraulic resistance presented to fluid at the inlet port 152 of the valve body 150. In certain examples the second valve 120 is similar to the first valve 118, is also operably associated with the controller 108, and additionally fluidly couples the manifold 116 to the second turbine 124 to provide cooling to the second turbine 124 when throttle such that the valve member therein abuts the stop supported within the valve body.

With continuing reference to FIG. 2, the controller 108 includes a processor 162, a device interface 164, a user interface 166, and a memory 168. The processor 162 is operably connected to the user interface 166 (which is optional) and is disposed in communication with the device interface 164 and the memory 168. The device interface 164 operably connected the processor 108 to the first valve 118 and the second valve 120 for throttling the first valve 118 and the second valve 120 through the link 132. In certain examples the link 132 is a physical link, e.g., a wire or communication bus. In accordance with certain examples the link 132 is a wireless link or communication bus. The memory 168 has a plurality of program modules 170 recorded on it that, when read by the processor 162, cause the processor to execute certain operations, e.g., operations of a method 200 (shown in FIG. 5) of controlling flow through the air cycle machine 100, as will be described. It is contemplated that the controller 108 be implemented through circuitry, software, or a combination of circuitry and software.

Figure 5:
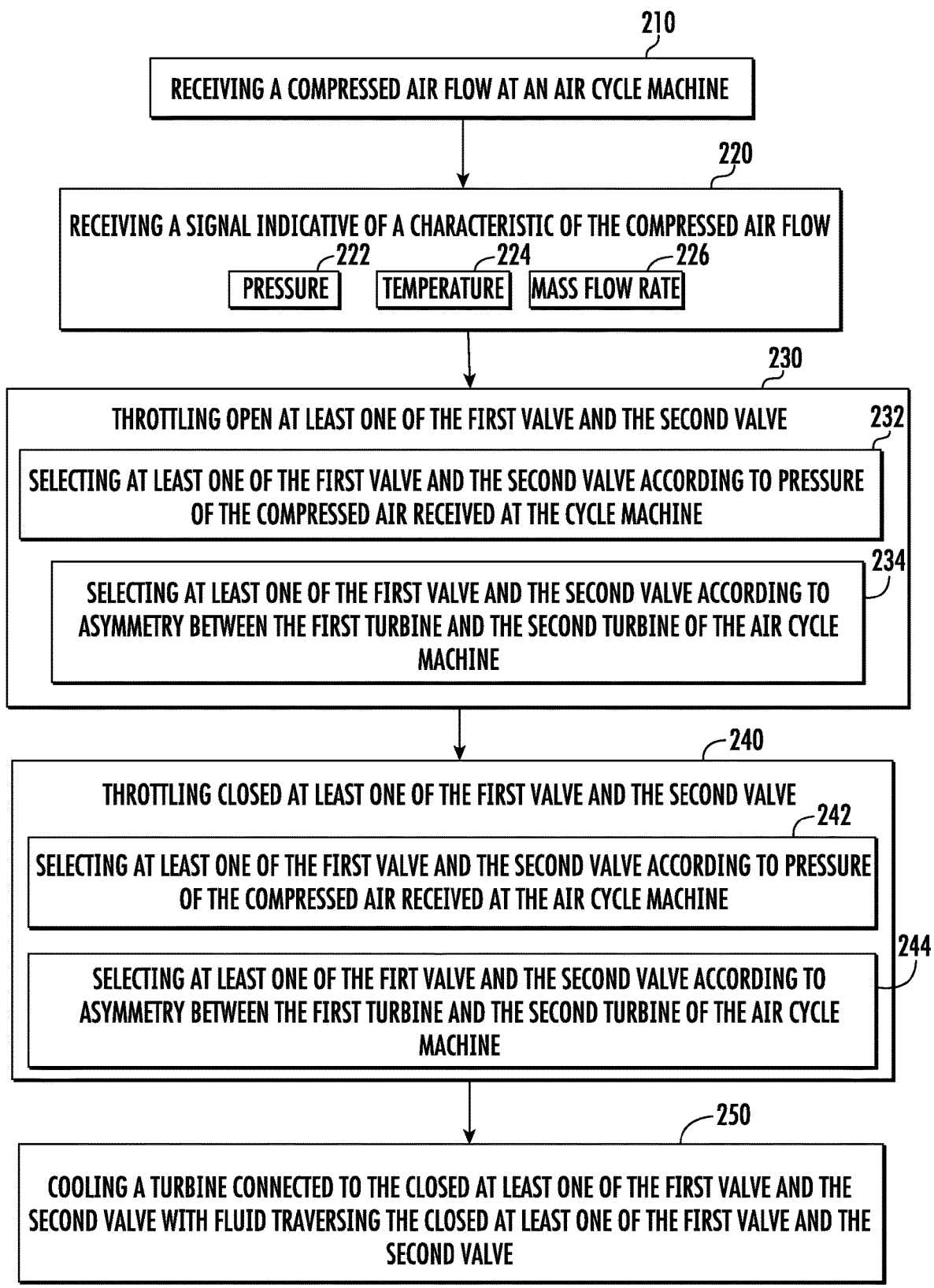
FIG. 5 is a block diagram of a method of controlling flow through an air cycle machine according to an illustrative and non-limiting example of the method, showing operations of the method.

With reference to FIG. 5, the method 200 of controlling flow through the air cycle machine 100 (shown in FIG. 1) is shown. As shown with box 210, the method includes receiving a compressed air flow, e.g., the compressed air flow 22 (shown in FIG. 1), at the air cycle machine. As shown with box 220, the method also includes receiving a signal indicative of a characteristic of the compressed air flow. The flow characteristic can include one or more of pressure, temperature, and mass flow rate, as shown by boxes 222-226.

As shown with box 230, at least one of a first valve and a second valve, e.g., the first valve 118 (shown in FIG. 1) and the second valve 120 (shown in FIG. 1), can be throttled open to change hydraulic resistance of the air cycle machine, e.g., reducing hydraulic resistance of the air cycle machine. In certain the at least one of the first valve and the second valve is selected according to pressure of the compressed air received at the air cycle machine, e.g., by comparing the flow characteristic to a lookup table recorded on a memory and associating flow characteristic value to valve throttling settings, as shown with box 232. In accordance with certain examples the at least one of the first valve and the second valve is selected according to the asymmetry between a first turbine connected to the first valve and a second turbine connected to the second valve, e.g., between the first turbine 122 (shown in FIG. 2) and the second turbine 124 (shown in FIG. 2). In this respect the at least one of the first valve and the second valve throttled open can be the more efficient of the first valve and the second valve at the pressure of the compressed air provided to the air cycle machine.

As shown with box 240, at least one of the first valve and the second valve can be throttled closed to change hydraulic resistance of the air cycle machine, e.g., by increasing hydraulic resistance of the air cycle machine. In certain the at least one of the first valve and the second valve is selected according to pressure of the compressed air received at the air cycle machine, e.g., by comparing the flow characteristic to a lookup table recorded on a memory and associating flow characteristic value to valve throttling settings, as shown with box 242. In accordance with certain examples the at least one of the first valve and the second valve is selected according to the asymmetry between the first turbine connected to the first valve and the second turbine connected to the second valve. In this respect the at least one of the first valve and the second valve throttled closed can be the lesser efficient of the first valve and the second valve at the pressure of the compressed air provided to the air cycle machine. It is also contemplated that the method 200 include cooling the turbine connected downstream of the valve throttled closed, e.g., the first turbine when the first valve is throttled closed and the second turbine when the second valve is throttled closed, as shown with box 250.

Flow control valves are commonly provided to air cycle machines to provide control over inlet pressure to the air cycle machine. Such flow control valves generally allow turndown when desired, typically by throttling away pressure. While throttling away pressure is suitable for providing control of inlet pressure to the air cycle machine throttling away pressure can reduce efficiency of the air cycle machine by causing the air cycle machine turbine to operate less efficiently than otherwise possible.

In examples described herein air cycle machines are provided having duel parallel turbines and valve connected in parallel between the air cycle machine compressor and the load cooling heat exchanger. In certain examples the first valve and the second valve are throttle valves, the valves thereby allowing for changing the hydraulic resistance presented compressed air received by the air cycle machine. In accordance with certain examples the valves enable control of flow through the air cycle machine without the need to throttle away pressure externally, e.g., via an intervening flow control valve fluidly coupling the air cycle machine to the compressed air source, flow being controlled by matching hydraulic resistance of the air cycle machine to pressure of the compressed air flow provided to the air cycle machine. It is also contemplated that, in accordance with certain examples, the dual parallel turbines can be asymmetric, allowing for throttling the valves such that the more efficient of the asymmetric turbines receive compressed fluid.

Technical effects of the present disclosure provide the capability to limit hydraulic resistance of air cycle machines internally, using two or more turbines connected to the air cycle machine compressor by a throttle valve. Technical effects of the present disclosure also include the capability to provide control similar to that provided by an external flow control valve, using pressure communicated to the air cycle machine more efficiently than air cycle machines employing flow control valves. Technical effects of the present disclosure additionally provide the capability to throttle flow through the air cycle machine turbines without employing two-position turbine nozzles—avoiding the efficiency reduction attendant with the turbine flow by nozzle leakage and/or incidence angle changes typically associated with two-position nozzles.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An air cycle machine, comprising:
  a compressor in fluid communication with a load cooling heat exchanger;
  a first valve and a first turbine connecting the compressor to the load cooling heat exchanger;
  a second valve and a second turbine connecting the compressor to the load cooling heat exchanger, wherein the second valve and the second turbine are connected in parallel with the first valve and the first turbine between the compressor and the load cooling heat exchanger;
  a controller operatively connected to the first valve and the second valve; and
  a memory in communication with the controller and having a plurality of program modules recorded thereon with instructions that cause the controller to:
  throttle open at least one of the first valve and the second valve;
  throttle closed at least one of the first valve and the second valve;
  receive a flow characteristic of a compressed air flow provided to the air cycle machine; and
  select one of the first valve and the second valve for throttling according to the received flow characteristic and a difference between efficiency of the first turbine and the second turbine associated with the received flow characteristic.

2. The air cycle machine of claim 1, further comprising a primary heat exchanger connected to the compressor, the compressor connecting the primary heat exchanger to the first valve and the second valve.

3. The air cycle machine of claim 1, further comprising a secondary heat exchanger connected to the compressor, the secondary heat exchanger connecting the compressor to the first valve and the second valve.

4. The air cycle machine of claim 1, further comprising a union connecting the first turbine to the second turbine and therethrough to the load cooling heat exchanger.

5. The air cycle machine of claim 1, wherein the first valve has a closed position, the first valve fluidly coupling the compressor to the first turbine in the closed position to cool the first turbine.

6. The air cycle machine of claim 1, wherein the second valve has a closed position, the second valve fluidly coupling the compressor to the second turbine in the closed position to cool the second turbine.

7. The air cycle machine of claim 1, further comprising a common shaft operably connecting the first turbine and the second turbine to the compressor.

8. The air cycle machine of claim 1, further comprising a compressed air source connected to the air cycle machine without an intervening flow control valve.

9. The air cycle machine of claim 1, wherein the first turbine is a first fixed turbine, wherein the second turbine is a second fixed turbine.

10. The air cycle machine of claim 1, wherein the second turbine is symmetrical to the first turbine.

11. The air cycle machine of claim 1, wherein the second turbine is asymmetrical to the first turbine.

12. The air cycle machine of claim 1, wherein throttling open the at least one of the first valve and the second valve includes reducing hydraulic resistance of the air cycle machine, wherein throttling closed at least one of the first valve and the second valve includes increasing hydraulic resistance of the air cycle machine.

13. The air cycle machine of claim 1, wherein throttling open the at least one of the first valve and the second valve is in response to decrease in pressure of compressed air received at the compressor.

14. The air cycle machine of claim 1, wherein throttling open at least one of the first valve and the second valve is in response to increase in pressure of compressed air received at the compressor.

15. A method of controlling flow through an air cycle machine, comprising:
  at an air cycle machine including a compressor in fluid communication with a load cooling heat exchanger; a first valve and a first turbine connecting the compressor to the load cooling heat exchanger; and a second valve and a second turbine connecting the compressor to the load cooling heat exchanger, the second valve and the second turbine connected in parallel with the first valve and the first turbine;
  throttling open at least one of the first valve and the second valve; and
  throttling closed at least one of the first valve and the second valve;
  receiving a flow characteristic of a compressed air flow provided to the air cycle machine; and
  selecting one of the first valve and the second valve for throttling according to the received flow characteristic and a difference between efficiency of the first turbine and the second turbine associated with the received flow characteristic.

16. The method of claim 15, further comprising cooling the first turbine or the second turbine connected to the closed at least one of the first valve and the second valve with a portion of the compressed air flow traversing the closed at least one of the first valve and the second valve.

* * * * *